United States Patent [19]

Cackowski

[11] 4,406,492
[45] Sep. 27, 1983

[54] FLOOR MAT

[76] Inventor: Joseph M. Cackowski, 15 Ledge Terrace, Old Bridge, N.J. 08857

[21] Appl. No.: 323,237

[22] Filed: Nov. 20, 1981

[51] Int. Cl.³ ............................................. B60N 3/04
[52] U.S. Cl. ...................................... 296/1 F; 15/238
[58] Field of Search ................. 15/238, 217, 216, 161, 15/112; 296/1 F

[56] References Cited

U.S. PATENT DOCUMENTS

| | | | |
|---|---|---|---|
| 2,810,672 | 10/1957 | Taylor | 296/1 F |
| 3,050,329 | 8/1962 | Pagan | 15/238 X |
| 3,082,032 | 3/1963 | Stata | 15/238 X |
| 3,149,875 | 9/1964 | Stata | 296/1 F |
| 3,488,081 | 1/1970 | Nolen | 296/1 F |
| 4,211,447 | 7/1980 | Di Vincenzo | 296/1 F |
| 4,280,729 | 7/1981 | Morawski | 296/1 F |

*Primary Examiner*—Chris K. Moore
*Attorney, Agent, or Firm*—Stanley W. Sokolowski

[57] ABSTRACT

According to the depicted embodiment, the novel Floor Mat is formed of a substantially planar sheet having a first portion for overlying a firewall, and a second portion for overlying a level floor, both portions having raised ribs. The ribs of the first portion extend generally diagonally thereacross, with an intervening, center channel, devoid of ribs, through which particulate matter is induced to flow—toward the second portion. The latter portion has a multiplicity of the aforesaid ribs, the same extending in spaced apart disposition, parallel with the sides of the Mat. A multiplicity of apertures are formed in the sheet, interveningly between the multiplicity of parallel ribs. However, immediately adjacent to the apertures, the ribs are relieved, to allow particulate matter to flow to the apertures. In a center portion of the floor-overlying portion of the Mat, immediately adjacent to the apertures, the ribs are bridged across, by low wall members. The bridging wall members are shallow enough to allow particulate matter to flow thereover, yet they provide lateral support to the ribs which they bridge. From the ends thereof adjacent to the first portion of the Mat to the ends thereof opposite, the ribs of the second portion are of diminishing depth, again to induce flow of particulate matter away from the center area of the Mat.

7 Claims, 4 Drawing Figures

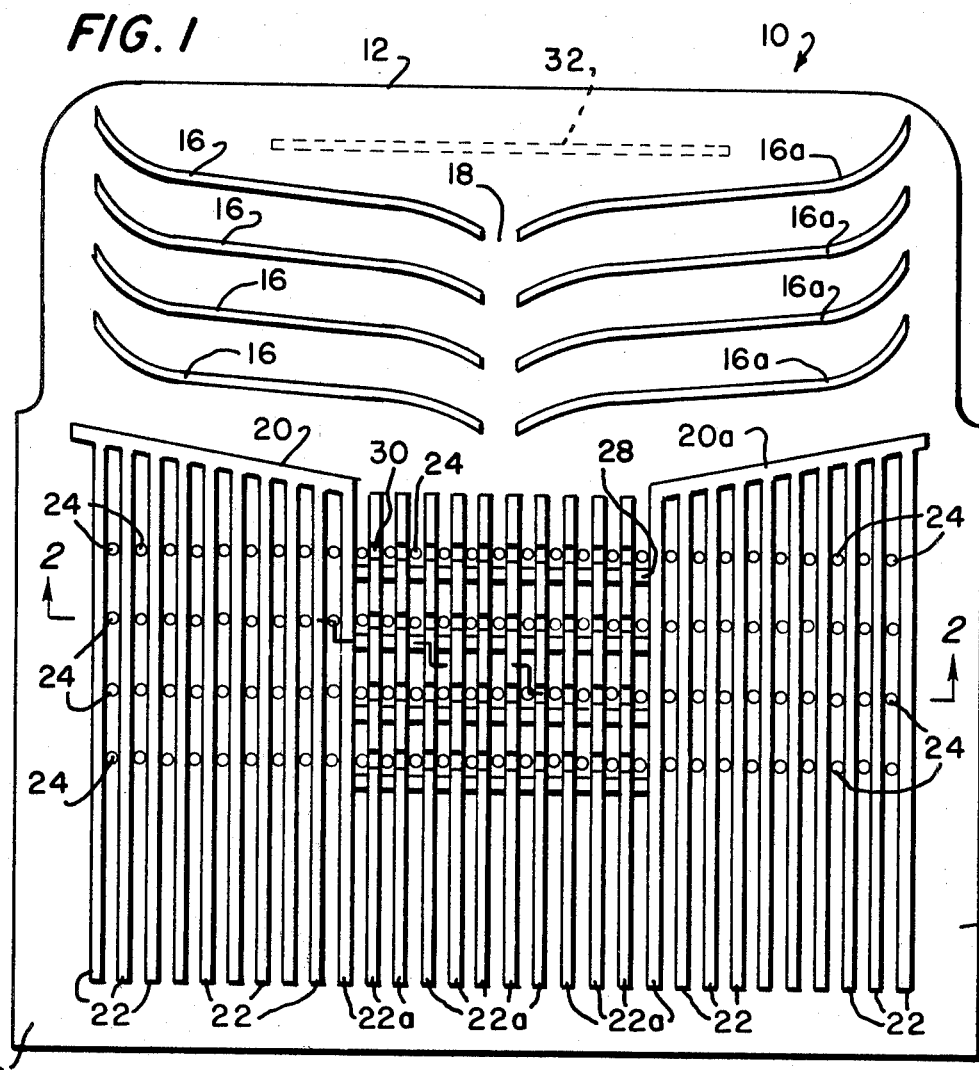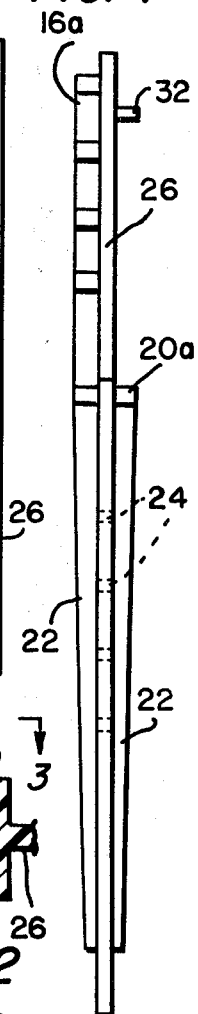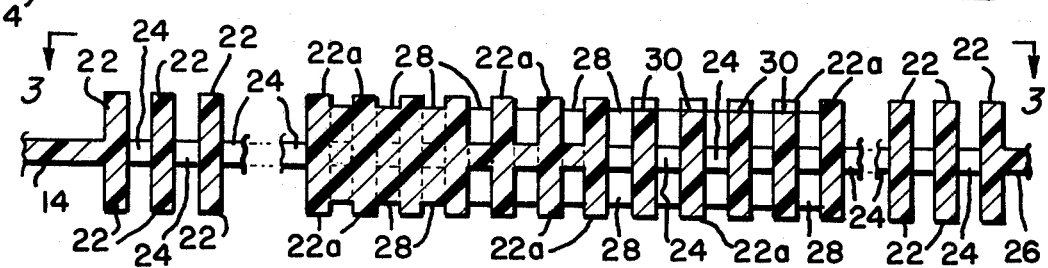

FLOOR MAT

This invention pertains to floor mats, for use in the cabs of automobiles and trucks, which have firewalls and level floors, for supporting the foot of the operator of the vehicle in adjacency to the accelerator and brake pedals thereof, and in particular to such floor mats which are especially configured to confine and/or control grit, dirt, and like particulate matter.

Floor mats of the aforesaid type, which are known in the prior art, typically employ ribs to isolate the operator's foot from particulate matter which collects on the mat. However, such ribs are circular, or extend horizontally of the mat, and when they well up with particulate matter, the latter simply migrates to the area of the mat under the heel of the operator's foot. It becomes necessary, frequently, to lift the mat from the vehicle and remove the ground-in grime and dirt therefrom. During the intervening periods, the heel of the shoe of the operator is working in the collection of particulate matter, becoming scuffed, and providing a source of abrasive and moisture-attracting mass.

Some prior art floor mats have ribs which extend parallel to the sides thereof, to collect grit and such particulate matter therebetween. However, these too simply mass the matter in overflowing collections which invariably migrate to below the heel of the shoe of the operator.

What has been needed for a long time is an improved, thoughtful floor mat which efficiently controls the flow of particulate matter away from the heel of the shoe, surely supports the heel in elevation above the nominal surface of the mat, and evacuates the particulate matter away from the upper right and upper left areas of the mat toward the central area. It is an object of this invention to provide a novel floor mat which does meet the long-felt need.

Particularly, it is an object of this invention to set forth a floor mat, for use in the cab of a vehicle which has a firewall and a level floor, comprising a first portion for overlying a firewall; and a second portion, contiguous with said first portion for overlying a floor; wherein said first and second portions have center areas flanked by substantially parallel sides; and said first portion has means for inducing flow of particulate matter, such as grit, dirt, and the like, to said center area thereof.

Further objects of this invention, as well as the novel features thereof, will become more apparent by reference to the following description taken in conjunction with the accompanying figures, in which:

FIG. 1 is a front elevational view of the novel floor mat, according to an embodiment thereof;

FIG. 2 is a discontinuous, fragmentary view of the mat of FIG. 1, in cross-section, the latter taken along section 2—2 of FIG. 1, and in greater scale;

FIG. 3 is a top view of the fragmentary portion of the mat of FIG. 2, taken along 3—3 of FIG. 2, in the same scale as FIG. 2; and FIG. 4 is a side view of the floor mat, in the scale of FIG. 1, and taken from the right-hand side of FIG. 1.

As shown in the Figures, my novel floor mat 10 has a first portion 12 for overlying the firewall of a vehicle cab, and a second portion 14, contiguous with the first portion, for overlying the floor of such cab. The first portion 12 has a plurality of generally diagonal, albeit slightly serpentine ribs 16 and 16a in elevation thereon. Inboard of the mat 10, the ribs 16 and 16a are confronting along a free channel 18. With the first portion 12 disposed at an inclination, upon a firewall, particulate matter deposited on the first portion is induced to travel along the ribs 16 and 16a, toward the center portion of the first portion 12, to the channel 18. From the latter, the particulate matter flows toward the second portion 14 of the mat.

Diagonal gating ribs 20 and 20a, disposed below portion 12 and above or at the top of portion 14 cooperate to confine the channel-traversing particulate matter to travel thereof into a center portion of portion 14. Particulate matter which overflows the gating ribs 20 and 20a, and which is deposited on the mat 10 below the ribs 20 and 20a, is confined within grooves defined by a multiplicity of parallel, spaced apart ribs 22 which rise from the second portion 14. Transverse rows of apertures 24 are formed in the grooves intervening the ribs. The mat 12 comprises a substantially planar sheet 26, and the apertures 24 open on opposite sides of the sheet 26 to pass the particulate matter therethrough from the obverse side of the mat (shown in FIG. 1) to the reverse side thereof.

The ribs 22 are of diminishing depth, from the upper reaches of portion 14 to the lower reaches thereof, and are disposed on both sides of the sheet 26. Thus, with portion 14 placed on a level or horizontal floor, vehicle vibration will induce flow of particulate matter along, between the ribs 22, to the lower reaches of the mat 10. Most of the particulate matter deposited on the obverse face of the mat 10 will pass through the apertures 24 and fall to the floor of the vehicle cab. That which travels downwardly from the last row of apertures 24 is carried away from the heel of the shoe of the operator.

In the upper-central area of portion 14, means are provided to render adequate support for the right shoe as it presses and twists when the driver exits the vehicle. In this area, the parallel ribs 22a are bridged therebetween by walls 28 of shallow depth. The walls 28 are in juxtaposition with the rib-intervening apertures 24, and are formed of shallow depths to insure that particulate matter will pass into the apertures before it can mass to the elevation of the ribs 22a. For the same reason, immediately adjacent to the apertures 24 the ribs 22a are relieved; thereat they have recesses 30. The latter are right-angular, and they accommodate flow of particulate matter into the apertures 24 thereadjacent.

As will be apparent, the ribs 22 on the reverse side of the sheet 26 support the sheet 26 in elevation above the floor of the vehicle cab, and allow particulate matter to fall to the vehicle cab floor via the apertures 24. To aid in preventing slippage of the mat 10 relative to the floor and firewall of the vehicle cab, the portion 12 has a transverse rib 32 on the reverse side thereof. The rib 32 cooperates with the ribs 22 on the reverse side of the mat 10 to retain the mat 10 in place. Walls 28 lend lateral support to the ribs 22a, in the upper-control area of portion 14 where most of the weight of the operator's foot is disposed, yet they allow particulate matter to migrate therealong without allowing such matter to collect and mass thereat. All particulate matter flow is induced in a direction away from the aforesaid upper right and left central area; no walls or ribs or the like are found thereat which will permit such a collection of matter as will reach the heel of the operator's shoe. The ribs 22 on which the heel will rest have the lateral stability to support the weight, and keep the heel always in elevation above any possible accumulation of particulate matter thereat.

While I have described my invention in connection with a specific embodiment thereof, it is to be clearly understood that this is done only by way of example, and not as a limitation to the scope of my invention, as set forth in the objects thereof, and in the appended claims.

I claim:

1. A floor mat, for use in the cab of a vehicle which has a firewall and a level floor, comprising:
   a first portion for overlying a firewall; and
   a second portion, contiguous with said first portion, for overlying a floor; wherein
   said first and second portions have center areas flanked by substantially parallel sides;
   said first portion has means cooperative with gravity for inducing flow of particulate matter, such as grit, dirt, and the like, to said center area thereof;
   at least one of said first and second portions has means cooperative with gravity for inducing flow of particulate material therealong substantially in parallel with said sides thereof;
   said parallel-flow inducing means comprises a multiplicity of spaced apart ribs;
   said at least one portion has a multiplicity of throughgoing apertures formed therein; and
   said apertures intervene between said multiplicity of ribs; and further including
   means bridging between said ribs for supporting said ribs against lateral deformation.

2. A floor mat, according to claim 1, wherein:
   said flow inducing means comprising means for inducing flow of particulate matter from said center area of said first portion to said center area of said second portion.

3. A floor mat, according to claim 1, wherein:
   said ribs extend, from adjacent to the other of said first and second portions, toward an end of said at least one portion which is opposite from said other portion, to define leading and trailing ends of said ribs, respectively; and
   said ribs have a diminishing depth, from said leading ends thereof to said trailing ends thereof.

4. A floor mat, according to claim 1, wherein:
   said first and second portions comprise a substantially planar sheet; and further including
   means for supporting a foot in isolation from said planar sheet;
   said foot-supporting means comprising a multiplicity of ribs formed on said sheet.

5. A floor mat, according to claim 1, wherein:
   said ribs-supporting, bridging means are juxtaposed with said apertures.

6. A floor mat, according to claim 1, wherein:
   said ribs are relieved where said intervening apertures are formed, to define thereat low walls of given depths over which particulate matter can migrate; and
   said bridging means also comprise low walls of said given depths.

7. A floor mat, according to claim 1, further including:
   means for supporting said sheet in isolation above a vehicle cab floor;
   said sheet-supporting means comprising ribs formed on the reverse side of said sheet.

* * * * *